(12) United States Patent
Tcheng (10) Patent No.: US 9,697,849 B1
(45) Date of Patent: Jul. 4, 2017

(54) SYSTEMS AND METHODS FOR AUDIO BASED SYNCHRONIZATION USING ENERGY VECTORS

(71) Applicant: GOPRO, INC., San Mateo, CA (US)

(72) Inventor: David Tcheng, Vista, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 15/219,081

(22) Filed: Jul. 25, 2016

(51) Int. Cl.
   *G10L 21/055*  (2013.01)
   *G10L 25/18*   (2013.01)
   *G10L 25/06*   (2013.01)
   *G06F 3/16*    (2006.01)
   *G10L 19/018*  (2013.01)

(52) U.S. Cl.
   CPC ............ *G10L 21/055* (2013.01); *G06F 3/165* (2013.01); *G10L 19/018* (2013.01); *G10L 25/06* (2013.01); *G10L 25/18* (2013.01)

(58) Field of Classification Search
   CPC .... G10L 21/055; G10L 19/018; G10L 19/167
   USPC ......................................................... 381/97
   See application file for complete search history.

(56) References Cited

U.S. PATENT DOCUMENTS

| | | | |
|---|---|---|---|
| 5,175,769 A | 12/1992 | Hejna | |
| 6,564,182 B1 | 5/2003 | Gao | |
| 7,012,183 B2 | 3/2006 | Herre | |
| 7,256,340 B2 | 8/2007 | Okazaki | |
| 7,301,092 B1 | 11/2007 | McNally | |
| 7,461,002 B2 * | 12/2008 | Crockett | .................. 704/200.1 |
| 7,521,622 B1 | 4/2009 | Zhang | |
| 7,593,847 B2 | 9/2009 | Oh | |
| 7,619,155 B2 | 11/2009 | Teo | |
| 7,672,836 B2 | 3/2010 | Lee | |
| 7,745,718 B2 | 6/2010 | Makino | |
| 7,767,897 B2 | 8/2010 | Jochelson | |
| 7,863,513 B2 | 1/2011 | Ishii | |
| 7,985,917 B2 | 7/2011 | Morris | |
| 8,101,845 B2 | 1/2012 | Kobayashi | |
| 8,111,326 B1 | 2/2012 | Talwar | |
| 8,179,475 B2 * | 5/2012 | Sandrew | ............... G11B 27/10 348/515 |
| 8,193,436 B2 | 6/2012 | Sim | |
| 8,205,148 B1 * | 6/2012 | Sharpe | ................ G11B 27/034 715/203 |
| 8,223,978 B2 | 7/2012 | Yoshizawa | |
| 8,378,198 B2 | 2/2013 | Cho | |
| 8,411,767 B2 | 4/2013 | Alexander | |
| 8,428,270 B2 | 4/2013 | Crockett | |
| 8,497,417 B2 | 7/2013 | Lyon | |
| 8,785,760 B2 | 7/2014 | Serletic | |
| 8,964,865 B2 | 2/2015 | Alexander | |
| 9,031,244 B2 | 5/2015 | Lang | |
| 9,418,643 B2 | 8/2016 | Eronen | |
| 2002/0133499 A1 | 9/2002 | Ward | |
| 2003/0033152 A1 | 2/2003 | Cameron | |
| 2004/0083097 A1 | 4/2004 | Chu | |

(Continued)

*Primary Examiner* — Nafiz E Hoque
(74) *Attorney, Agent, or Firm* — Sheppard Mullin Richter & Hampton LLP (57) ABSTRACT

Multiple audio files may be synchronized using energy vectors produced from energy portions of individual frequency energy representations. Individual energy samples and time values of individual energy vectors may be compared using a multi-resolution framework to correlate energy samples and time values of multiple audio tracks to one another.

16 Claims, 6 Drawing Sheets

(56) References Cited

U.S. PATENT DOCUMENTS

| | | |
|---|---|---|
| 2004/0094019 A1 | 5/2004 | Herre |
| 2004/0148159 A1 | 7/2004 | Crockett |
| 2004/0165730 A1 | 8/2004 | Crockett |
| 2004/0172240 A1 | 9/2004 | Crockett |
| 2004/0254660 A1 | 12/2004 | Seefeldt |
| 2004/0264561 A1 | 12/2004 | Alexander |
| 2005/0021325 A1 | 1/2005 | Seo |
| 2005/0091045 A1 | 4/2005 | Oh |
| 2005/0234366 A1 | 10/2005 | Heinz |
| 2006/0021494 A1 | 2/2006 | Teo |
| 2006/0080088 A1 | 4/2006 | Lee |
| 2006/0107823 A1 | 5/2006 | Platt |
| 2007/0055503 A1 | 3/2007 | Chu |
| 2007/0055504 A1 | 3/2007 | Chu |
| 2007/0061135 A1 | 3/2007 | Chu |
| 2007/0163425 A1 | 7/2007 | Tsui |
| 2007/0240556 A1 | 10/2007 | Okazaki |
| 2008/0148924 A1 | 6/2008 | Tsui |
| 2008/0304672 A1 | 12/2008 | Yoshizawa |
| 2008/0317150 A1 | 12/2008 | Alexander |
| 2009/0049979 A1 | 2/2009 | Naik |
| 2009/0056526 A1 | 3/2009 | Yamashita |
| 2009/0170458 A1 | 7/2009 | Molisch |
| 2009/0217806 A1 | 9/2009 | Makino |
| 2009/0287323 A1 | 11/2009 | Kobayashi |
| 2010/0257994 A1 | 10/2010 | Hufford |
| 2011/0167989 A1 | 7/2011 | Cho |
| 2012/0103166 A1 | 5/2012 | Shibuya |
| 2012/0127831 A1 | 5/2012 | Gicklhorn |
| 2012/0297959 A1 | 11/2012 | Serletic |
| 2013/0025437 A1 | 1/2013 | Serletic |
| 2013/0201972 A1 | 8/2013 | Alexander |
| 2013/0220102 A1 | 8/2013 | Savo |
| 2013/0304243 A1 | 11/2013 | Iseli |
| 2013/0339035 A1 | 12/2013 | Chordia |
| 2014/0053710 A1 | 2/2014 | Serletic, II |
| 2014/0053711 A1 | 2/2014 | Serletic, II |
| 2014/0067385 A1 | 3/2014 | Oliveira |
| 2014/0123836 A1* | 5/2014 | Vorobyev ............ G10H 1/0008 84/616 |
| 2014/0180637 A1 | 6/2014 | Kerrigan |
| 2014/0307878 A1 | 10/2014 | Osborne |
| 2015/0279427 A1 | 10/2015 | Godfrey |
| 2016/0192846 A1 | 7/2016 | Shekhar |

* cited by examiner

SYSTEMS AND METHODS FOR AUDIO BASED SYNCHRONIZATION USING ENERGY VECTORS

FIELD OF THE INVENTION

The disclosure relates to synchronizing multiple audio tracks using energy vectors.

BACKGROUND OF THE INVENTION

Multiple media recordings may be generated during the same live occurrence. The media recordings obtained from multiple media capture devices during the same live occurrence may be synchronized using the audio features of the media recordings. Audio features may be extracted from an audio track in the frequency domain.

SUMMARY

One or more aspects of the present disclosure relate to a synchronization of multiple media files using audio features. Audio features may include energy, frequency, and/or other features. More specifically, energy features may be used to construct energy vectors produced from energy portions of individual frequency energy representations. Individual energy vector may include energy samples and time values. Multiple energy vectors of multiple audio tracks may be compared using a multi-resolution framework to correlate energy samples and time values of multiple energy vectors to one another. The results of the correlation may be used to determine a temporal offset between multiple audio tracks. The temporal offset may be used to synchronize multiple audio tracks.

In some implementations, a system configured for synchronization of multiple media files using energy vectors may include one or more servers. Server(s) may be configured to communicate with one or more client computing platforms according to a client/server architecture. The users of system may access system via client computing platform (s). Server(s) may be configured to execute one or more computer program components. The computer program components may include one or more of an audio track component, a frequency component, a resolution component, an energy vector component, a comparison component, a temporal alignment component, a synchronizing component, and/or other components.

A repository of media files may be available via system (e.g., via an electronic storage and/or other storage location). The repository of media files may be associated with different users. In some implementations, the system and/or server(s) may be configured for various types of media files that may include video files that include audio content, audio files, and/or other types of files that include some audio content. Other types of media items may include one or more of audio files (e.g., music, podcasts, audio books, and/or other audio files), multimedia presentations, photos, slideshows, and/or other media files. The media files may be received from one or more storage locations associated with client computing platform(s), server(s), and/or other storage locations where media files may be stored. Client computing platform(s) may include one or more of a cellular telephone, a smartphone, a digital camera, a laptop, a tablet computer, a desktop computer, a television set-top box, a smart TV, a gaming console, and/or other client computing platforms. In some implementations, the plurality of media files may include audio files that may not contain video content.

The audio track component may be configured to obtain one or more audio tracks from one or more media files. By way of non-limiting illustration, a first audio track and/or other audio tracks may be obtained from a first media file and/or other media files. The audio track component may be configured to obtain a second audio track from a second media file. The first media file and the second media file may be available within the repository of media files available via system 100 and/or available on a third party platform, which may be accessible and/or available via system 100.

One or more of the first media file, the second media file, and/or other media files may be media files captured by the same user via one or more client computing platform(s) and/or may be media files captured by other users. In some implementations, the first media file, the second media file, and/or other media files may be of the same live occurrence. As one example, the files may include files of the same event, such as videos of one or more of a sporting event, concert, wedding, and/or events taken from various perspectives by different users. In some implementations, the first media file, the second media file, and/or other media files may not be of the same live occurrence but may be of the same content. For example, the first media file may be a user-recorded file of a song performance and the second media file may be the same song performance by a professional artist.

The audio track component may be configured to obtain audio tracks from media files by extracting audio signals from media files, and/or by other techniques. By way of non-limiting illustration, the audio track component may be configured to obtain the first audio track by extracting audio signal from the first media file. The audio track component may be configured to obtain the second audio track by extracting an audio signal from the second media file.

The audio track component may be configured to extract one or more audio energy representations from one or more audio tracks. By way of non-limiting illustration, a first audio energy representation and/or other representations may be extracted from a first audio track and/or other audio tracks. The audio track component may be configured to extract a second audio energy representation and/or other energy representations from the second audio track and/or other audio tracks.

The audio track component may be configured to transform one or more audio energy representations into a frequency domain to generate a spectral energy profile of the one or more audio energy representations. By way of non-limiting illustration, the audio track component may be configured to transform a first audio energy representation of the first audio track into a first frequency domain to generate a first spectral energy profile of the first audio energy representation. The audio track component 106 may be configured to transform a second audio energy representation of the second audio track into a second frequency domain to generate a second spectral energy profile of the first audio energy representation. The frequency domain information may be presented as a spectrogram (e.g., a time-frequency representation) where the time is on the horizontal axis and the frequency is on the vertical axis. The frequency spectrum (spectrogram column) along the time axis is segmented into frequency bands in the range of 1 Hz to 10,000 Hz. Spectral energy of every band is calculated.

The frequency component may be configured to filter the spectral energy profile of one or more audio energy representations of one or more audio tracks into multiple audio frequency energy representations of varying frequencies by applying a bandpass filter. By way of non-limiting illustration, the frequency component may be configured to filter the spectral energy profile of the first audio energy representation from the first audio track into multiple audio frequency energy representations of varying frequencies by applying a bandpass filter. The frequency component may be configured to filter the spectral energy profile of the second audio energy representation from the second audio track into multiple audio frequency energy representations of varying frequencies by applying the bandpass filter. The bandpass filter may be applied in the range of 0 Hz to 10,000 Hz. As a result, the frequency component may be configured to obtain multiple audio frequency energy representations as a function of time (e.g., f1, f2, f3, . . . fn) where f1 is an audio frequency energy representation at a first frequency, f2 is an audio frequency energy representation at a second frequency, and so on.

In some implementations, frequency bands of the bandpass filter used to filter an audio energy representation into individual frequency energy by may be spaced in accordance to one or more parameters. For example, frequency bands may be spaced based on a value generated by system, set by a user, and/or otherwise obtained. The predetermined parameter may indicate a width of a frequency bands and/or other information. For example, the frequency band may be logarithmically spaced.

The resolution component may be configured to arrange individual energy samples within one or more frequency energy representations obtained via the frequency component using a multi-resolution representation. The multi-resolution representation may provide a hierarchical framework of energy samples of varying resolutions. Energy samples arranged within the hierarchical framework may be arranged in varying resolution levels. Individual resolution levels may be defined in terms of energy magnitude contained within individual energy samples at individual resolution levels. Resolution levels may be expressed in terms of sampling periods where length of a sampling period refers to a resolution level. Thus, one or more individual frequency energy representations may be expressed in terms of varying resolution levels where individual energy samples of varying energy magnitude may be arranged within individual resolution level.

The energy vector component may be configured to produce one or more energy vectors for one or more individual audio tracks. By way of non-limiting illustration, an energy vector may be defined as a one-dimensional matrix containing an array of energy samples selected at an individual time period and/or defined by other terms. One or more energy samples within one or more energy vectors may be obtained from one or more energy portions of individual frequency energy representations of one or more audio energy representations of one or more audio tracks. Energy portions may be configured as time periods of predetermined length (e.g., 10-30 seconds) and may be set in predetermined intervals (e.g., 30-60 seconds). Both, the time period and time period spacing may be set by a predetermined parameter generated by system 100, set by a user, and/or obtained by other means. For example, an energy vector for a time period t may be represented as $Vt:=(E1t, E2t, \ldots , Ent)$. Where t refers to a time period of an energy portion and where numerical identifiers 1, 2, . . . n refer to a frequency band of an frequency energy representation E. Thus, individual elements of an energy vector may be configured as being multi-component and having an energy component and a time component.

In some implementations, the energy vector component may be configured to produce a sequence of vectors for multiple time periods for one or more audio tracks. For example an individual audio track may have a sequence of energy vectors $Vt1, Vt2, \ldots Vtn$, where $Vt1=(E1t1 \ldots Ent1)$. Individual array of energy samples within a vector may refer to energy samples within individual frequency energy representations at individual times. The energy vector component may be configured to produce a sequence of energy vectors for multiple time periods for an individual audio track at individual resolution levels.

For example, the energy vector component may be configured to produce a first energy vector for a first audio track comprising an array of individual energy samples of the first frequency energy representation and the second frequency energy representation at a first time period at a first resolution level. The energy vector component may be configured to produce a second energy vector for the first audio track comprising an array of individual energy samples of the first frequency energy representation and the second frequency energy representation at the first time period at a second resolution level. The energy vector component may be configured to produce a first energy vector for a second audio track comprising an array of individual energy samples of the first frequency energy representation and the second frequency energy representation at the first time period at the first resolution level. The energy vector component may be configured to produce a second energy vector for the second audio track comprising an array of individual energy samples of the first frequency energy representation and the second frequency energy representation the first time period at the resolution level.

The comparison component may be configured to compare one or more energy portions of one or more frequency energy representations of one or more audio tracks. One or more energy portions of one or more frequency representations may be designated by one or more energy vectors. By way of non-limiting illustration, the comparison component may be configured to compare a first energy portion designated by the first energy vector of the first audio energy representation against a second energy portion designated by the second energy vector of the second audio representation energy representation to correlate individual energy samples and their corresponding time interval values.

The process performed by the comparison component may be performed iteratively until a result of such comparison is determined. For example, after comparing individual energy vectors of individual frequency energy representations at individual time periods of the first audio track against individual energy vectors of individual frequency energy representations at individual time periods of a second audio track at multiple energy portions, multiple correlation results may be obtained. The correlation results may be transmitted to system 100 and a determination for the most accurate result may be made.

In some implementations, the comparison component may be configured to compare individual energy vectors of individual frequency energy representations at individual time periods of the first audio track against individual energy vectors of individual frequency energy representations at individual time periods of the second audio track within the multi-resolution framework obtained via the resolution component.

For example, the comparison component may be configured to compare the energy vector of the first and second frequency energy representation of the first audio track against the first energy vector of the first and second frequency energy representation of the second audio track at a mid-resolution level. Energy samples of the first portion of the first and second frequency energy resolution of the first audio track at the mid-resolution level may be compared against energy samples of the first portion of the first and second frequency energy resolution of the second audio track at the mid-resolution level to correlate energy values and time values between the first audio track and the second audio track. The result of a first comparison may identify correlated energy and time values from the first and second audio tracks that may represent energy in the same sound. The result of first comparison may be transmitted to the system after the first comparison is completed.

The second comparison may be performed at a level of resolution that may be higher than the mid-resolution level. The energy samples of the first portion of the first and second frequency energy resolution of the first energy track at the higher resolution level may be compared against the energy samples of the first portion of the first and second frequency energy resolution of the second energy track at the higher resolution level. The result of the second comparison may be transmitted to the system.

This process may be iterative such that the comparison component may compare the energy samples of individual frequency energy resolutions of the first energy track against the energy samples of individual frequency energy resolutions of the second energy track at every resolution level whereby increasing the resolution with every iteration until the highest level of resolution is reached. For example, if the number of resolution levels within individual energy track is finite, the comparison component may be configured to compare frequency energy resolutions at a mid-resolution level first, then, at next iteration, the comparison component may be configured to compare frequency energy resolutions at a resolution level higher than the resolution level of previous iteration, and so on. The last iteration may be performed at the highest resolution level. The system may accumulate a number of transmitted correlation results obtained from the comparison component. The correlation results may be transmitted to the system and a determination for the most accurate result may be made.

In various implementations, the comparison component may be configured to apply one or more constraint parameter to control the comparison process. The comparison constraint parameters may include one or more of limiting comparison time, limiting the energy portion, limiting frequency bands, limiting the number of comparison iterations and/or other constrains.

The comparison component may be configured to determine the time it took to compare the first energy vector of the first audio track against the first energy vector of the second audio track at the mid-resolution level. Time taken to compare energy samples and time of the first energy vector of the first audio track against energy samples and time of the first energy vector of the second audio track at the mid-resolution level may be transmitted to the system. The comparison component may utilize the time taken to compare energy samples and time at a particular resolution level in subsequent comparison iterations. For example, time taken to compare two energy vectors at a low resolution may be equal to 5 seconds. The comparison component may be configured to limit the next comparison iteration at a higher resolution to 5 seconds. In one implementation, the time taken to compare two energy vectors may be utilized by the other constraint comparison parameters and/or used as a constant value.

The comparison component may be configured to limit the audio energy representation within frequency energy representations of individual vectors by applying a comparison window set by a comparison window parameter. The comparison component may be configured to limit the number of energy samples being compared by applying the comparison window parameter (i.e., by setting a comparison window). The comparison window parameter may include a number of energy samples to which the comparison may be limited. This value may be predetermined by the system, set by a user, and/or otherwise obtained.

The comparison window parameter may have a predetermined start position that may be generated by the system and/or may be based on user input. the system may generate the start position of the comparison window based on the total energy representation of an frequency energy representation, i.e. the total number of energy samples at a certain resolution level within individual frequency energy representations. For example, the start position may be randomly set to the initial one third of the frequency energy representation. In some implementations, the user may generate the start position of the comparison window based on specific audio features of the audio track. For example, user may know that a first audio track and a second audio track may contain audio features that represent sound captured at the same football game, specifically first touchdown of the game. Energy sample(s) representing audio features associated with the touchdown may be used to generate the start position of the comparison window.

The comparison component may be configured to limit the same portion of the audio energy representation of energy based on the comparison window parameter during every comparison iteration. Alternatively, in some implementations, the comparison component may be configured to limit different portions of the first and second energy tracks based on the comparison window parameter during individual comparison iteration. For example, the comparison window parameter may be generated every time the comparison of the energy tracks at a specific resolution is performed. In other words, the start position of the comparison window parameter may be different with every comparison iteration irrespective of the start position of the comparison window parameter at the previous resolution level.

The comparison component may be configured to limit the number of comparison iterations based on a correlation threshold parameter. The comparison component may be configured to generate a correlation coefficient based on a result of a first comparison that may identify correlated energy and time values between individual energy vectors. The comparison component may be configured to obtain a threshold value. The threshold value may be generated by the system, may be set by a user, and/or obtained by other means. The comparison component may be configured to compare the correlation coefficient against the threshold value. The comparison component may be configured to stop the comparison when the correlation coefficient falls below the threshold value.

The temporal alignment component may be configured to determine a temporal alignment estimate between multiple audio tracks. By way of non-limiting illustration, the temporal alignment component may be configured to determine a temporal alignment estimate between multiple audio tracks based on the results of comparing one or more energy vectors produced by the energy vector component via the comparison component, and/or based on other techniques. The temporal alignment estimate may reflect an offset in time between a commencement of sound on one or more audio tracks. In some implementations, the temporal alignment estimate may reflect a corresponding energy portion sample between individual energy representations of individual audio tracks, and/or other values.

The temporal alignment component may be configured to identify a pair of matching energy samples within individual frequency energy representations of individual energy vectors of individual audio tracks. The temporal alignment component may identify the pair of matching energy samples from individual comparison iteration via the comparison component. Temporal alignment component may be configured to calculate a Δt, or time offset value, based on a position of the matching energy samples within corresponding frequency energy representations.

In some implementations, the temporal alignment component may be configured to determine multiple temporal alignment estimates between the first audio track and the second audio track. Individual temporal alignment estimates may be based on comparing individual frequency energy representations of individual energy vectors of individual audio tracks via the comparison component, as described above. The temporal alignment component may be configured to assign a weight to individual temporal alignment estimates. The temporal alignment component may be configured to determine a final temporal alignment estimate by computing weighted averages of multiple temporal alignment estimates and/or by performing other computations.

In some implementations, the temporal alignment component may be configured to use individual playback rates associated with individual audio tracks when determining the temporal alignment estimate. Using individual playback rates as a factor in determining audio track alignment may correct a slight difference in sample clock rates associated with equipment on which audio tracks may have been recorded. For example, multiple individual temporal alignment estimates may be analyzed along with individual playback rates of each audio track. A final temporal alignment estimate may be computed by taking into account both individual temporal alignment estimates and playback rates and/or other factors. A liner correction approach and/or other approach may be taken.

The synchronizing component may be configured to synchronize one or more audio tracks. By way of non-limiting illustration, the synchronizing component may be configured to use comparison results obtained via the comparison component of comparing one or more energy vectors of one or more audio tracks, and/or using other techniques. The synchronizing component may be configured to synchronize the first audio track with the second audio track based on the temporal alignment estimate. In some implementations, the time offset between the energy tracks may be used to synchronize individual audio tracks by aligning the audio tracks based on the time offset calculation.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
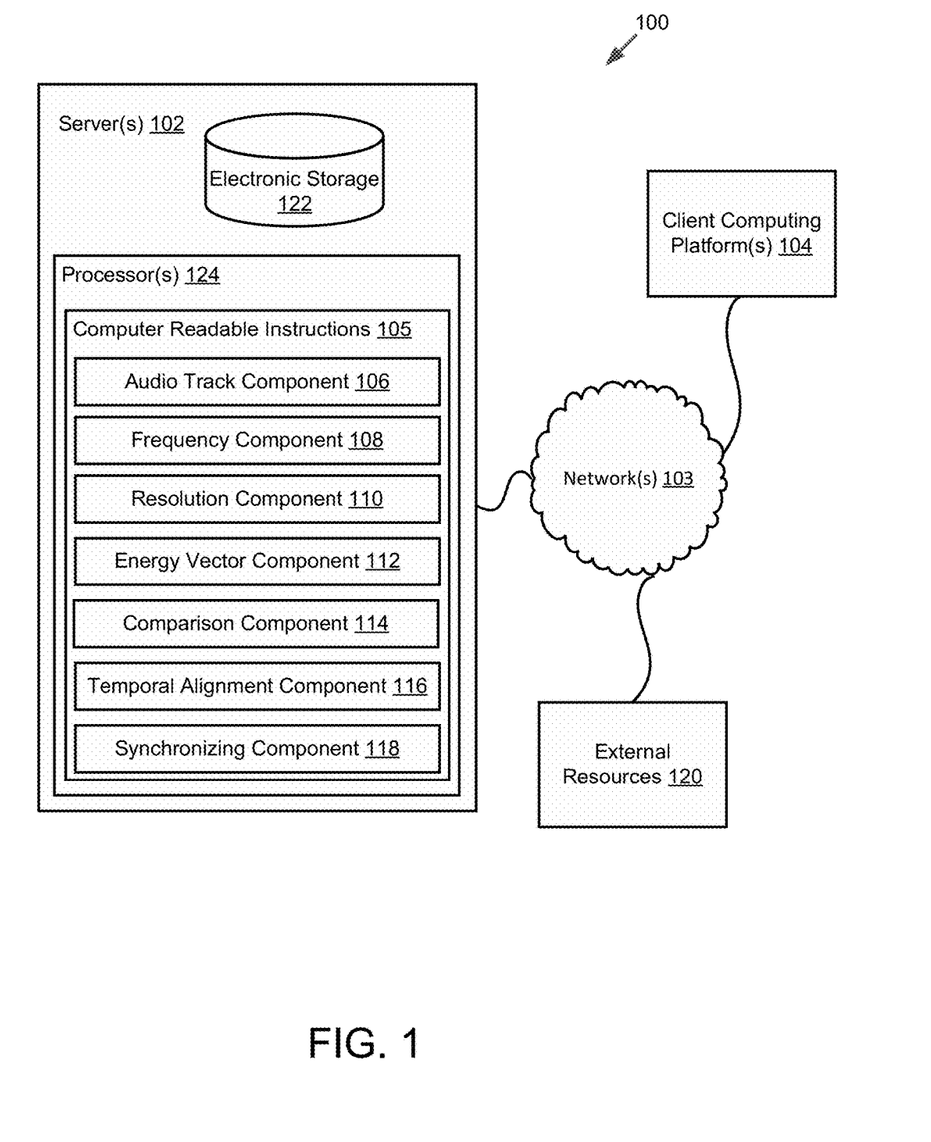
FIG. 1 illustrates a system for audio synchronization using energy vectors, in accordance with one or more implementations.

FIG. 1 illustrates system 100 for audio synchronization using energy vectors, in accordance with one or more implementations. As is illustrated in FIG. 1, system 100 may include one or more server(s) 102. Server(s) 102 may be configured to communicate with one or more client computing platforms 104 according to a client/server architecture. The users of system 100 may access system 100 via client computing platform(s) 104. Server(s) 102 may be configured to execute one or more computer program components. The computer program components may include one or more of audio track component 106, frequency component 108, resolution component 110, energy vector component 112, comparison component 114, temporal alignment component 116, synchronizing component 118, and/or other components.

A repository of media files may be available via system 100 (e.g., via electronic storage 122 and/or other storage location). The repository of media files may be associated with different users. In some implementations, system 100 and/or server(s) 102 may be configured for various types of media files that may include video files that include audio content, audio files, and/or other types of files that include some audio content. Other types of media items may include one or more of audio files (e.g., music, podcasts, audio books, and/or other audio files), multimedia presentations, photos, slideshows, and/or other media files. The media files may be received from one or more storage locations associated with client computing platform(s) 104, server(s) 102, and/or other storage locations where media files may be stored. Client computing platform(s) 104 may include one or more of a cellular telephone, a smartphone, a digital camera, a laptop, a tablet computer, a desktop computer, a television set-top box, a smart TV, a gaming console, and/or other client computing platforms. In some implementations, the plurality of media files may include audio files that may not contain video content.

Audio track component 106 may be configured to obtain one or more audio tracks from one or more media files. By way of non-limiting illustration, a first audio track and/or other audio tracks may be obtained from a first media file and/or other media files. Audio track component 106 may be configured to obtain a second audio track from a second media file. The first media file and the second media file may be available within the repository of media files available via system 100 and/or available on a third party platform, which may be accessible and/or available via system 100.

One or more of the first media file, the second media file, and/or other media files may be media files captured by the same user via one or more client computing platform(s) 104 and/or may be media files captured by other users. In some implementations, the first media file, the second media file, and/or other media files may be of the same live occurrence. As one example, the files may include files of the same event, such as videos of one or more of a sporting event, concert, wedding, and/or events taken from various perspectives by different users. In some implementations, the first media file, the second media file, and/or other media files may not be of the same live occurrence but may be of the same content. For example, the first media file may be a user-recorded file of a song performance and the second media file may be the same song performance by a professional artist.

Audio track component 106 may be configured to obtain audio tracks from media files by extracting audio signals from media files, and/or by other techniques. By way of non-limiting illustration, audio track component 106 may be configured to obtain the first audio track by extracting audio signal from the first media file. Audio track component 106 may be configured to obtain the second audio track by extracting an audio signal from the second media file. For example and referring to FIG. 2, an audio track 202 may contain audio information. Audio information may contain sound information which may be graphically visualized as waveform of sound pressure 250 as a function of time. The sound wave's amplitude is mapped on the vertical axis with time on the horizontal axis. Thus, the audio information contained within a media file may be extracted in the form of an audio track. Individual audio tracks may be synchronized with one another by comparing similarities between their corresponding sound wave information.

Referring back to FIG. 1, audio track component 106 may be configured to extract one or more audio energy representations from one or more audio tracks. By way of non-limiting illustration, a first audio energy representation and/or other representations may be extracted from a first audio track and/or other audio tracks. Audio track component 106 may be configured to extract a second audio energy representation and/or other energy representations from the second audio track and/or other audio tracks.

Figure 2:
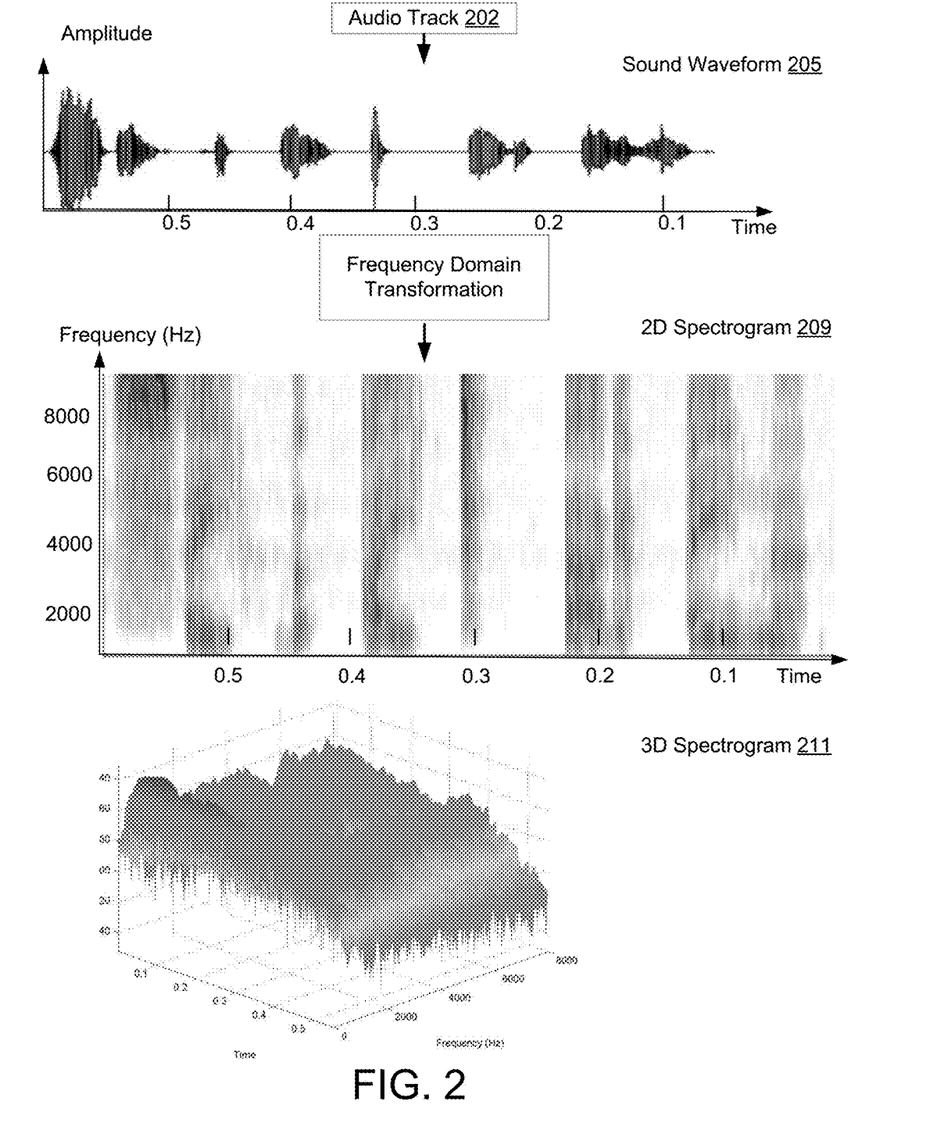
FIG. 2 illustrates an exemplary representation of obtaining a spectral energy profile of a sound waveform, in accordance with one or more implementations.

Audio track component 106 may be configured to transform one or more audio energy representations into a frequency domain to generate a spectral energy profile of the one or more audio energy representations. By way of non-limiting illustration, audio track component 106 may be configured to transform a first audio energy representation of the first audio track into a first frequency domain to generate a first spectral energy profile of the first audio energy representation. Audio track component 106 may be configured to transform a second audio energy representation of the second audio track into a second frequency domain to generate a second spectral energy profile of the first audio energy representation. The frequency domain information may be presented as a spectrogram (e.g., a time-frequency representation) where the time is on the horizontal axis and the frequency is on the vertical axis. The frequency spectrum (spectrogram column) along the time axis is segmented into frequency bands in the range of 1 Hz to 10,000 Hz. Spectral energy of every band is calculated. As illustrated in FIG. 2, waveform 205 of a sound wave of audio track 202 may be transformed into a frequency domain to generate a spectral energy profile. Frequency spectrum graph or spectrogram 209 tracks one or more of frequency, time and/or energy of sound in audio track 202. The horizontal direction of spectrogram 209 represents time, the vertical direction represents frequency, and energy is represented as a variation in color with a spectrogram column. Alternatively, 3D spectrogram 211 may present the same sound data in a 3-D graph, where vertical dimension represents energy.

Figure 3:
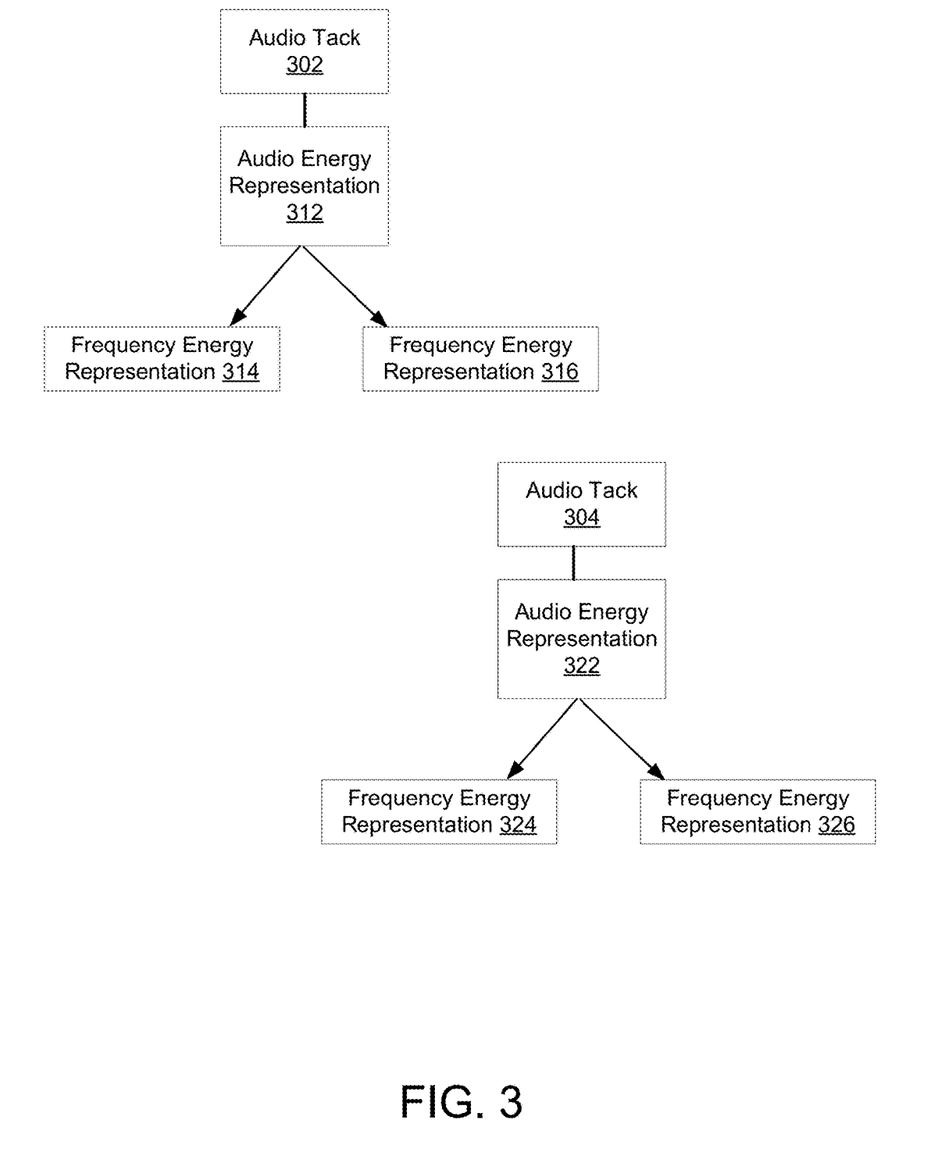
FIG. 3 illustrates an schematic of applying a bandpass filter to a spectral energy profile to obtain individual frequency energy representations, in accordance with one or more implementations.

Referring back to FIG. 1, frequency component 108 may be configured to filter the spectral energy profile of one or more audio energy representations of one or more audio tracks into multiple audio frequency energy representations of varying frequencies by applying a bandpass filter. By way of non-limiting illustration, frequency component 108 may be configured to filter the spectral energy profile of the first audio energy representation from the first audio track into multiple audio frequency energy representations of varying frequencies by applying a bandpass filter. Frequency component 106 may be configured to filter the spectral energy profile of the second audio energy representation from the second audio track into multiple audio frequency energy representations of varying frequencies by applying the bandpass filter. The bandpass filter may be applied in the range of 0 Hz to 10,000 Hz. As a result, frequency component 108 may be configured to obtain multiple audio frequency energy representations as a function of time (e.g., f1, f2, f3, fn) where f1 is an audio frequency energy representation at a first frequency, f2 is an audio frequency energy representation at a second frequency, and so on. For example, and as illustrated in FIG. 3, spectral energy profile of audio energy representation 312 of audio track 302 may be filtered into frequency energy representation 314 and frequency energy representation 316. Similarly, spectral energy profile of audio energy representation 322 of audio track 304 may be filtered into frequency energy representation 324 and frequency energy representation 226.

Referring back to FIG. 1, in some implementations, frequency bands of the bandpass filter used to filter an audio energy representation into individual frequency energy by may be spaced in accordance to one or more parameters. For example, frequency bands may be spaced based on a value generated by system 100, set by a user, and/or otherwise obtained. The predetermined parameter may indicate a width of a frequency bands and/or other information. For example, the frequency band may be logarithmically spaced.

Resolution component 110 may be configured to arrange individual energy samples within one or more frequency energy representations obtained via frequency component 108 using a multi-resolution representation. The multi-resolution representation may provide a hierarchical framework of energy samples of varying resolutions. Energy samples arranged within the hierarchical framework may be arranged in varying resolution levels. Individual resolution levels may be defined in terms of energy magnitude contained within individual energy samples at individual resolution levels. Resolution levels may be expressed in terms of sampling periods where length of a sampling period refers to a resolution level. Thus, one or more individual frequency energy representations may be expressed in terms of varying resolution levels where individual energy samples of varying energy magnitude may be arranged within individual resolution level.

For example, a frequency energy representation at low resolution may represent a certain number of energy samples conveying a large energy magnitude. Conversely, at a high resolution, the number of energy samples may increase while the energy magnitude individual energy sample conveys decreases. As the resolution increases the likelihood of finding corresponding energy samples between one or more frequency energy resolutions of one or more audio tracks may increase. It may be desirable to compare one or more frequency energy representations at a low resolution and then gradually increase the resolution level. Within the same time interval, number of energy samples at a certain resolution level may be equal to half of the number of energy samples of the previous resolution level. For example, at the highest level of resolution, the frequency energy resolution may contain 1024 or N energy samples. At the next level of resolution which is lower than the highest level of resolution, the frequency energy representation may contain 512 or N/2 energy samples. Subsequent resolution levels may contain 256, 128, 64, 32, 16, 8, 4, 2, until the lowest level of resolution is reached, containing only one energy sample. The single energy sample at the lowest level of resolution may represent all the energy within a specific time interval within that frequency energy representation. Conversely, the energy contained within individual samples of the 1024 samples at the highest level of resolution may represent the lowest single unit of energy associated with the audio track.

Energy vector component 112 may be configured to produce one or more energy vectors for one or more individual audio tracks. By way of non-limiting illustration, an energy vector may be defined as a one-dimensional matrix containing an array of energy samples selected at an individual time period and/or defined by other terms. One or more energy samples within one or more energy vectors may be obtained from one or more energy portions of individual frequency energy representations of one or more audio energy representations of one or more audio tracks. Energy portions may be configured as time periods of predetermined length (e.g., 10-30 seconds) and may be set in predetermined intervals (e.g., 30-60 seconds). Both, the time period and time period spacing may be set by a predetermined parameter generated by system 100, set by a user, and/or obtained by other means. For example, an energy vector for a time period t may be represented as $Vt:=(E1t, E2t, \ldots, Ent)$. Where t refers to a time period of an energy portion and where numerical identifiers 1, 2, ... n refer to a frequency band of an frequency energy representation E. Thus, individual elements of an energy vector may be configured as being multi-component and having an energy component and a time component.

Figure 4:
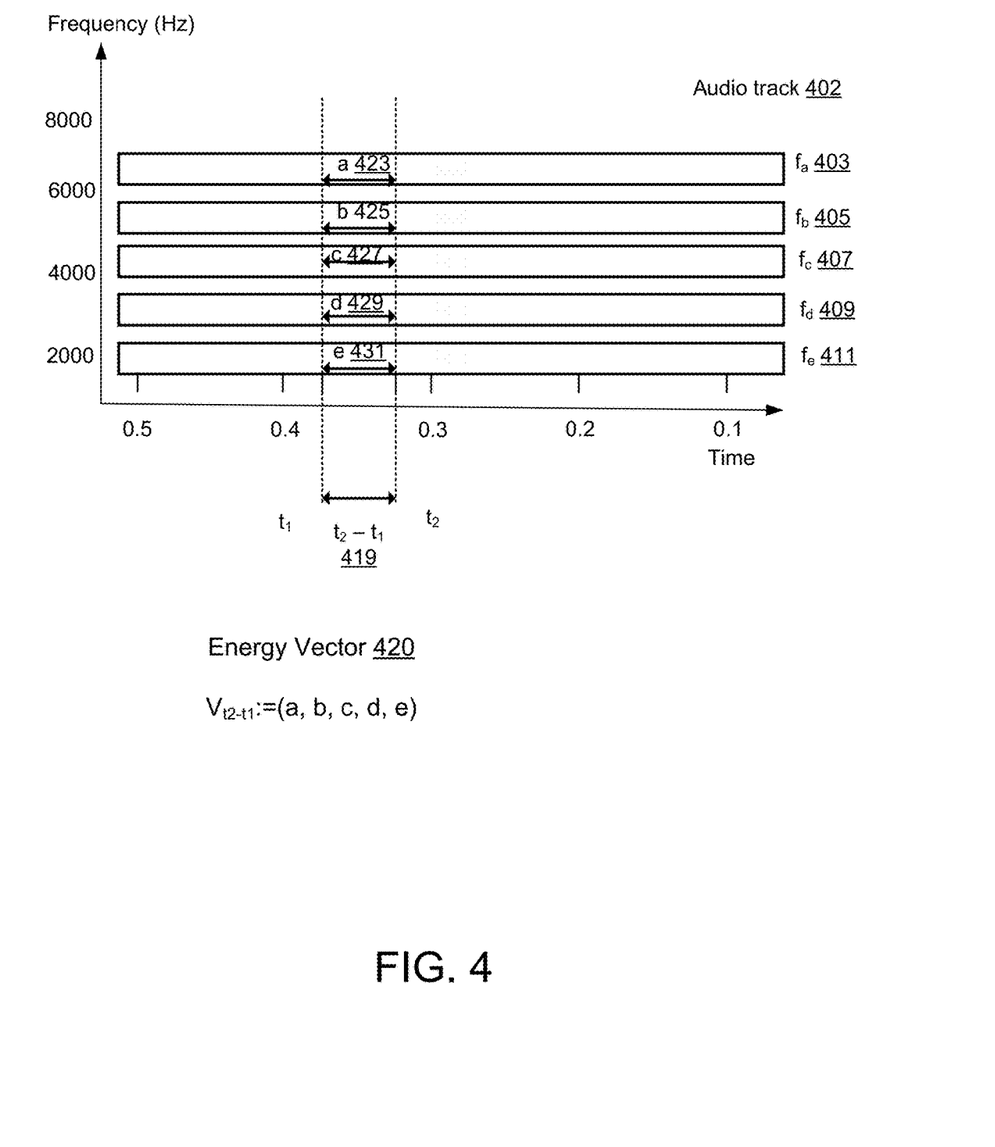
FIG. 4 illustrates an exemplary schematic of producing an energy vector from individual frequency energy representations, in accordance with one or more implementations.

For example, and referring to FIG. 4, audio energy representation of audio track 402 filtered by a bandpass filter into energy bands frequency representations, including one or more of frequency energy representation 403, frequency energy representation 405, frequency energy representation 407, frequency energy representation 409, frequency energy representation 411, and/or other representations. All frequency energy representations are arranged in order of energy magnitude as a function of time. Portions of frequency energy representations within time interval 419, may be identified as 423, 425, 427, 429, and 431. Energy vector 440 for time interval 419 may be produced comprising an array of portions of frequency energy representations 423, 425, 427, 429, and 431.

Referring back to FIG. 1, in some implementations, energy vector component 112 may be configured to produce a sequence of vectors for multiple time periods for one or more audio tracks. For example an individual audio track may have a sequence of energy vectors $Vt1, Vt2, \ldots Vtn$, where $Vt1=(E1t1 \ldots Ent1)$. Individual array of energy samples within a vector may refer to energy samples within individual frequency energy representations at individual times. Energy vector component 112 may be configured to produce a sequence of energy vectors for multiple time periods for an individual audio track at individual resolution levels.

For example, energy vector component 112 may be configured to produce a first energy vector for a first audio track comprising an array of individual energy samples of the first frequency energy representation and the second frequency energy representation at a first time period at a first resolution level. Energy vector component 112 may be configured to produce a second energy vector for the first audio track comprising an array of individual energy samples of the first frequency energy representation and the second frequency energy representation at the first time period at a second resolution level. Energy vector component 112 may be configured to produce a first energy vector for a second audio track comprising an array of individual energy samples of the first frequency energy representation and the second frequency energy representation at the first time period at the first resolution level. Energy vector component 112 may be configured to produce a second energy vector for the second audio track comprising an array of individual energy samples of the first frequency energy representation and the second frequency energy representation the first time period at the resolution level.

Comparison component 114 may be configured to compare one or more energy portions of one or more frequency energy representations of one or more audio tracks. One or more energy portions of one or more frequency representations may be designated by one or more energy vectors. By way of non-limiting illustration, comparison component 114 may be configured to compare a first energy portion designated by the first energy vector of the first audio energy representation against a second energy portion designated by the second energy vector of the second audio representation energy representation to correlate individual energy samples and their corresponding time interval values.

Figure 5:
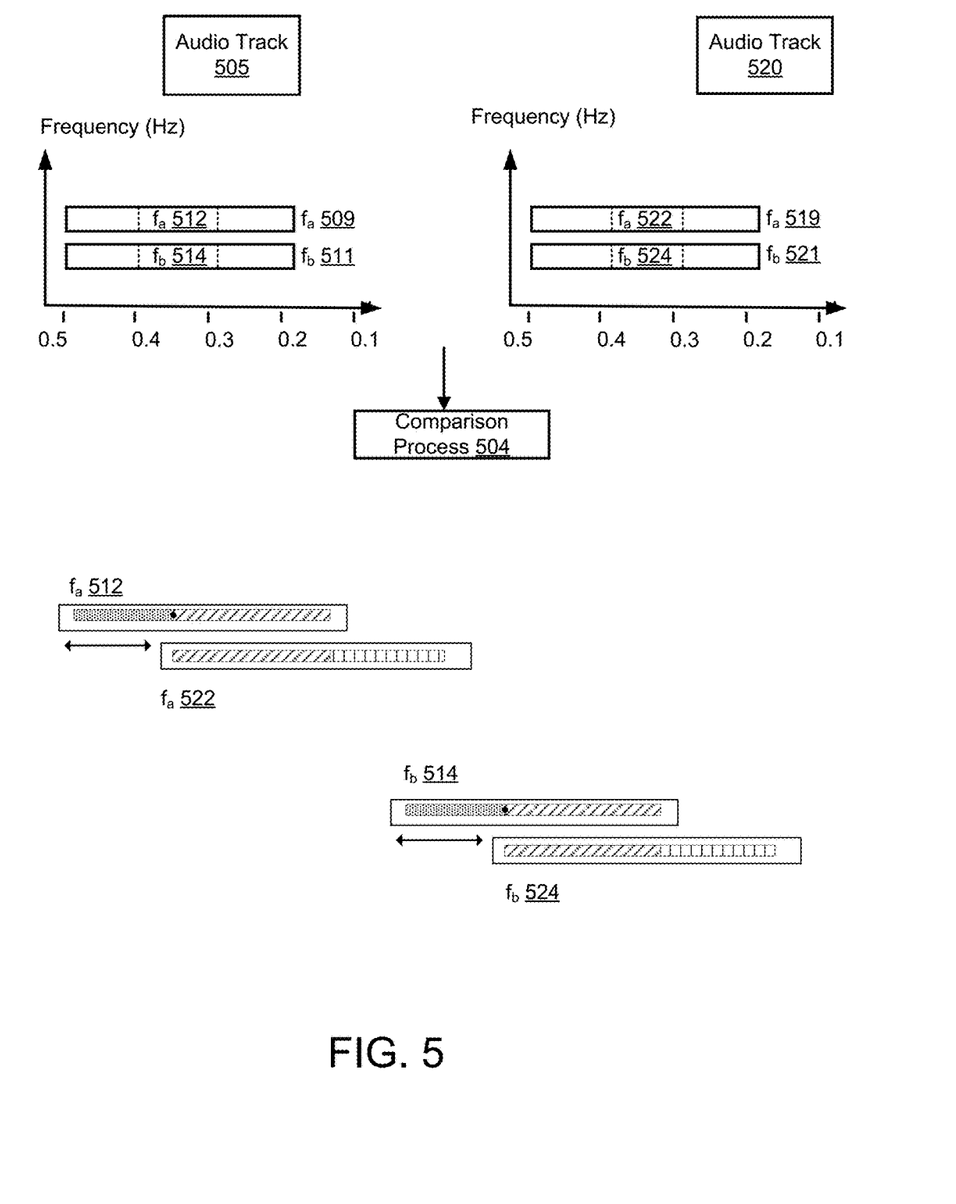
FIG. 5 illustrates an exemplary schematic of a comparison process applied to energy vectors generated from two audio tracks, in accordance with one or more implementations.

For example, and as illustrated by FIG. 5, comparison process 504 may compare first energy portion of energy samples 512 of first frequency energy representation 509 of first audio track 505 against first energy portion of energy samples 522 of first frequency energy representation 519 of second audio track 520. Comparison process 504 may compare first energy portion of energy samples 514 of second frequency energy representation 511 of first audio track 505 against first energy portion of energy samples 524 of second frequency energy representation 521 of second energy track 520.

Referring back to FIG. 1, the process performed by comparison component 114 may be performed iteratively until a result of such comparison is determined. For example, after comparing individual energy vectors of individual frequency energy representations at individual time periods of the first audio track against individual energy vectors of individual frequency energy representations at individual time periods of a second audio track at multiple energy portions, multiple correlation results may be obtained. The correlation results may be transmitted to system 100 and a determination for the most accurate result may be made.

In some implementations, comparison component 114 may be configured to compare individual energy vectors of individual frequency energy representations at individual time periods of the first audio track against individual energy vectors of individual frequency energy representations at individual time periods of the second audio track within the multi-resolution framework obtained via resolution component 110 of FIG. 1.

For example, comparison component 114 may be configured to compare the energy vector of the first and second frequency energy representation of the first audio track against the first energy vector of the first and second frequency energy representation of the second audio track at a mid-resolution level. Energy samples of the first portion of the first and second frequency energy resolution of the first audio track at the mid-resolution level may be compared against energy samples of the first portion of the first and second frequency energy resolution of the second audio track at the mid-resolution level to correlate energy values and time values between the first audio track and the second audio track. The result of a first comparison may identify correlated energy and time values from the first and second audio tracks that may represent energy in the same sound. The result of first comparison may be transmitted to system 100 after the first comparison is completed.

The second comparison may be performed at a level of resolution that may be higher than the mid-resolution level. The energy samples of the first portion of the first and second frequency energy resolution of the first energy track at the higher resolution level may be compared against the energy samples of the first portion of the first and second frequency energy resolution of the second energy track at the higher resolution level. The result of the second comparison may be transmitted to system 100.

This process may be iterative such that comparison component 114 may compare the energy samples of individual frequency energy resolutions of the first energy track against the energy samples of individual frequency energy resolutions of the second energy track at every resolution level whereby increasing the resolution with individual iteration until the highest level of resolution is reached. For example, if the number of resolution levels within individual energy track is finite, comparison component 114 may be configured to compare frequency energy resolutions at a mid-resolution level first, then, at next iteration, comparison component 114 may be configured to compare frequency energy resolutions at a resolution level higher than the resolution level of previous iteration, and so on. The last iteration may be performed at the highest resolution level. System 100 may accumulate a number of transmitted correlation results obtained from comparison component 114. The correlation results may be transmitted to system 100 and a determination for the most accurate result may be made.

In various implementations, comparison component 114 may be configured to apply one or more constraint parameter to control the comparison process. The comparison constraint parameters may include one or more of limiting comparison time, limiting the energy portion, limiting frequency bands, limiting the number of comparison iterations and/or other constrains.

Comparison component 114 may be configured to determine the time it took to compare the first energy vector of the first audio track against the first energy vector of the second audio track at the mid-resolution level. Time taken to compare energy samples and time of the first energy vector of the first audio track against energy samples and time of the first energy vector of the second audio track at the mid-resolution level may be transmitted to system 100. Comparison component 114 may utilize the time taken to compare energy samples and time at a particular resolution level in subsequent comparison iterations. For example, time taken to compare two energy vectors at a low resolution may be equal to 5 seconds. Comparison component 114 may be configured to limit the next comparison iteration at a higher resolution to 5 seconds. In one implementation, the time taken to compare two energy vectors may be utilized by the other constraint comparison parameters and/or used as a constant value.

Comparison component 114 may be configured to limit the audio energy representation within frequency energy representations of individual vectors by applying a comparison window set by a comparison window parameter. Comparison component 114 may be configured to limit the number of energy samples being compared by applying the comparison window parameter (i.e., by setting a comparison window). The comparison window parameter may include a number of energy samples to which the comparison may be limited. This value may be predetermined by system 100, set by a user, and/or otherwise obtained.

In some implementation, comparison component 114 may be configured to limit the number of energy samples such that the comparison window parameter may not be greater than 50 percent of the total number of energy samples at a certain resolution level. For example, if an frequency energy representation contains 1024 energy samples at a certain resolution level, then the length of the comparison window set by the comparison window parameter may not be greater than 512 energy samples.

The comparison window parameter may have a predetermined start position that may be generated by system 100 and/or may be based on user input. System 100 may generate the start position of the comparison window based on the total energy representation of an frequency energy representation, i.e. the total number of energy samples at a certain resolution level within individual frequency energy representations. For example, the start position may be randomly set to the initial one third of the frequency energy representation. In some implementations, the user may generate the start position of the comparison window based on specific audio features of the audio track. For example, user may know that a first audio track and a second audio track may contain audio features that represent sound captured at the same football game, specifically first touchdown of the game. Energy sample(s) representing audio features associated with the touchdown may be used to generate the start position of the comparison window.

Comparison component 114 may be configured to limit the same portion of the audio energy representation of energy based on the comparison window parameter during every comparison iteration. Alternatively, in some implementations, comparison component 114 may be configured to limit different portions of the first and second energy tracks based on the comparison window parameter during individual comparison iteration. For example, the comparison window parameter may be generated every time the comparison of the energy tracks at a specific resolution is performed. In other words, the start position of the comparison window parameter may be different with every comparison iteration irrespective of the start position of the comparison window parameter at the previous resolution level.

Comparison component 114 may be configured to limit the number of comparison iterations based on a correlation threshold parameter. Comparison component 114 may be configured to generate a correlation coefficient based on a result of a first comparison that may identify correlated energy and time values between individual energy vectors. Comparison component 114 may be configured to obtain a threshold value. The threshold value may be generated by system 100, may be set by a user, and/or obtained by other means. Comparison component 114 may be configured to compare the correlation coefficient against the threshold value. Comparison component 114 may be configured to stop the comparison when the correlation coefficient falls below the threshold value.

Temporal alignment component 116 may be configured to determine a temporal alignment estimate between multiple audio tracks. By way of non-limiting illustration, temporal alignment component 116 may be configured to determine a temporal alignment estimate between multiple audio tracks based on the results of comparing one or more energy vectors produced by energy vector component 112 via comparison component 114, and/or based on other techniques. The temporal alignment estimate may reflect an offset in time between a commencement of sound on one or more audio tracks. In some implementations, the temporal alignment estimate may reflect a corresponding energy portion sample between individual energy representations of individual audio tracks, and/or other values.

Temporal alignment component 116 may be configured to identify a pair of matching energy samples within individual frequency energy representations of individual energy vectors of individual audio tracks. Temporal alignment component 116 may identify the pair of matching energy samples from individual comparison iteration via comparison component 114. Temporal alignment component 116 may be configured to calculate a Δt, or time offset value, based on a position of the matching energy samples within the corresponding frequency energy representations.

In some implementations, temporal alignment component 116 may be configured to determine multiple temporal alignment estimates between the first audio track and the second audio track. Individual temporal alignment estimates may be based on comparing individual frequency energy representations of individual energy vectors of individual audio tracks via comparison component 114, as described above. Temporal alignment component 116 may be configured to assign a weight to individual temporal alignment estimates. Temporal alignment component 116 may be configured to determine a final temporal alignment estimate by computing weighted averages of multiple temporal alignment estimates and/or by performing other computations.

In some implementations, temporal alignment component 116 may be configured to use individual playback rates associated with individual audio tracks when determining the temporal alignment estimate. Using individual playback rates as a factor in determining audio track alignment may correct a slight difference in sample clock rates associated with equipment on which audio tracks may have been recorded. For example, multiple individual temporal alignment estimates may be analyzed along with individual playback rates of each audio track. A final temporal alignment estimate may be computed by taking into account both individual temporal alignment estimates and playback rates and/or other factors. A liner correction approach and/or other approach may be taken.

Synchronizing component 118 may be configured to synchronize one or more audio tracks. By way of non-limiting illustration, synchronizing component 118 may be configured to use comparison results obtained via comparison component 114 of comparing one or more energy vectors of one or more audio tracks, and/or using other techniques. Synchronizing component 118 may be configured to synchronize the first audio track with the second audio track based on the temporal alignment estimate. In some implementations, the time offset between the energy tracks may be used to synchronize individual audio tracks by aligning the audio tracks based on the time offset calculation.

Referring again to FIG. 1, in some implementations, a user may generate a first media file containing both video and audio components. User may generate a second media file containing audio component corresponding to the same live occurrence. User may want to synchronize first media file with second media file. For example, a group of friends may record a video of them singing a musical composition. They may wish to overlay an audio component of the same musical composition they or another user performed earlier in the studio with the video file. By synchronizing the video file with the pre-recorded audio file users obtain a video file that contains a pre-recorded audio component overplayed over the video component.

In some implementations, system 100 may synchronize media files from three, four, five, or more media capture devices (not illustrated) capturing the same live occurrence. Users capturing live occurrence simultaneously may be located near or away from each other and may make recordings from various perspectives.

In some implementations, the plurality of media files may be generated by the same user. For example, a user may place multiple media recording devices around himself to record himself from various perspectives. Similarly, a film crew may generate multiple media files during a movie shoot of the same scene.

Referring again to FIG. 1, in some implementations, server(s) 102, client computing platform(s) 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 120 may be operatively linked via some other communication media.

A given client computing platform 104 may include one or more processors configured to execute computer program components. The computer program components may be configured to enable a producer and/or user associated with the given client computing platform 104 to interface with system 100 and/or external resources 120, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

External resources 120 may include sources of information, hosts and/or providers of virtual environments outside of system 100, external entities participating with system 100, and/or other resources. In some implementations, some or all of the functionality attributed herein to external resources 120 may be provided by resources included in system 100.

Server(s) 102 may include electronic storage 122, one or more processors 124, and/or other components. Server(s) 102 may include communication lines, or ports to enable the exchange of information with a network and/or other computing platforms. Illustration of server(s) 102 in FIG. 1 is not intended to be limiting. Servers(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 122 may include electronic storage media that electronically stores information. The electronic storage media of electronic storage 122 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 122 may include one or more virtual storage resources (e.g., cloud storage, a virtual private network, and/or other virtual storage resources). Electronic storage 122 may store software algorithms, information determined by processor(s) 124, information received from server(s) 102, information received from client computing platform(s) 104, and/or other information that enables server(s) 102 to function as described herein.

Processor(s) 124 may be configured to provide information processing capabilities in server(s) 102. As such, processor(s) 124 may include one or more of a digital processor, an analog processor, a digital circuit designed to process information, an analog circuit designed to process information, a state machine, and/or other mechanisms for electronically processing information. Although processor(s) 124 is shown in FIG. 1 as a single entity, this is for illustrative purposes only. In some implementations, processor(s) 124 may include a plurality of processing units. These processing units may be physically located within the same device, or processor(s) 124 may represent processing functionality of a plurality of devices operating in coordination. The processor(s) 124 may be configured to execute computer readable instruction components 106, 108, 110, 112, 114, 116, 118 and/or other components. The processor(s) 124 may be configured to execute components 106, 108, 110, 112, 114, 116, 118 and/or other components by software; hardware; firmware; some combination of software, hardware, and/or firmware; and/or other mechanisms for configuring processing capabilities on processor(s) 124.

It should be appreciated that although components 106, 108, 110, 112, and 114 are illustrated in FIG. 1 as being co-located within a single processing unit, in implementations in which processor(s) 124 includes multiple processing units, one or more of components 106, 108, 110, 112, 114, 116 and/or 118 may be located remotely from the other components. The description of the functionality provided by the different components 106, 108, 110, 112, 114, 116 and/or 118 described herein is for illustrative purposes, and is not intended to be limiting, as any of components 106, 108, 110, 112, 114, 116 and/or 118 may provide more or less functionality than is described. For example, one or more of components 106, 108, 110, 112, 114, 116 and/or 118 may be eliminated, and some or all of its functionality may be provided by other ones of components 106, 108, 110, 112, 114, 116 and/or 118. As another example, processor(s) 124 may be configured to execute one or more additional components that may perform some or all of the functionality attributed herein to one of components 106, 108, 110, 112, 114, 116 and/or 118.

Figure 6:
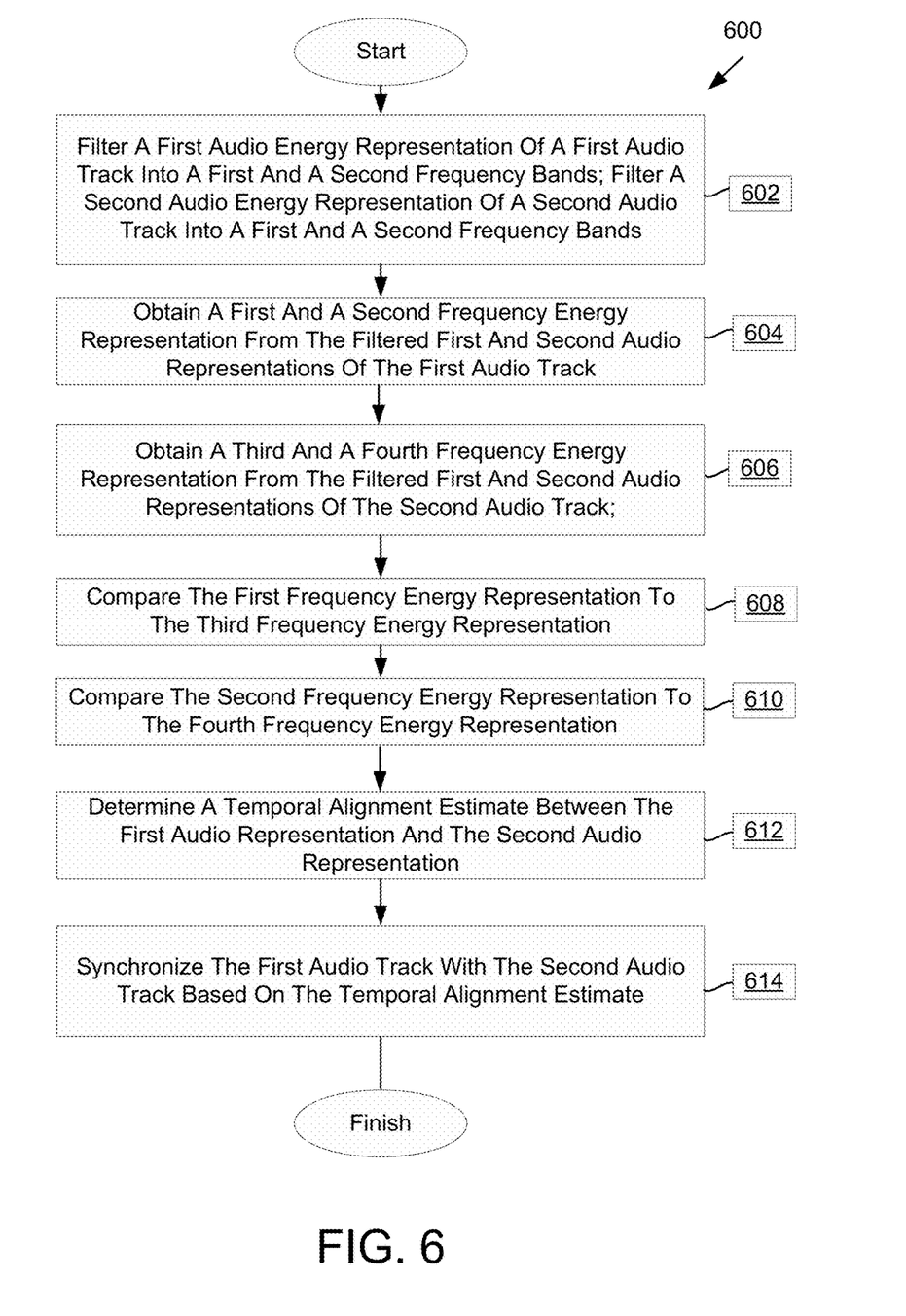
FIG. 6 illustrates a method for synchronizing video files using energy vectors, in accordance with one or more implementations.

FIG. 6 illustrates a method 600 for synchronizing video files using audio features, in accordance with one or more implementations. The operations of method 600 presented below are intended to be illustrative. In some implementations, method 600 may be accomplished with one or more additional operations not described, and/or without one or more of the operations discussed. Additionally, the order in which the operations of method 600 are illustrated in FIG. 6 and described below is not intended to be limiting.

In some implementations, method 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 600 in response to instructions stored electronically on an electronic storage medium. The one or more processing devices may include one or more devices configured through hardware, firmware, and/or software to be specifically designed for execution of one or more of the operations of method 600.

At an operation 602, a first audio energy representation of a first audio track may be filtered into a first and a second frequency bands and/or a second audio energy representation of a second audio track may be filtered into a first and a second frequency bands. At an operation 604, a first and a second frequency energy representation from the filtered first and second audio representations of the first audio track may be obtained. At an operation 606, a third and a fourth frequency energy representation from the filtered first and second audio representations of the second audio track may be obtained. Operations 602, 604, and 606 be performed by one or more physical processors executing a frequency component that is the same as or similar to frequency component 108, in accordance with one or more implementations.

At an operation 608, the first frequency energy representation may be compared be to the second frequency energy representation. At an operation 610, the second frequency energy representation may be compared to the fourth frequency energy representation Operations 608 and 610 may be performed by one or more physical processors executing a comparison component that is the same as or similar to comparison component 114, in accordance with one or more implementations.

At an operation 612, a temporal alignment estimate between the first audio representation and the second audio representation based on the comparison of the first frequency energy representation to the third frequency energy representation and the second frequency energy representation to the fourth frequency energy representation second energy track may be determined. Operation 612 may be performed by one or more physical processors executing a temporal alignment component that is the same as or similar to temporal alignment 116, in accordance with one or more implementations.

At an operation 614, a synchronization of the first audio track with the second audio track based on the temporal alignment estimate of the first audio representation and the second audio representation may be performed. Operation 614 may be performed by one or more physical processors executing a synchronizing component that is the same as or similar to synchronizing component 118, in accordance with one or more implementations.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A method for synchronizing audio tracks, comprising:
   filtering a first audio energy representation of a first audio track having a first track duration, into multiple frequency bands, the frequency bands including a first frequency band and a second frequency band to produce a first frequency energy representation and a second frequency energy representation, the first frequency energy representation representing individual energy samples associated with sound in the first frequency band captured on the first audio track, the first frequency energy representation including energy portions conveying energy magnitude for individual sampling periods of a first sampling period length, the second frequency energy representation representing individual energy samples associated with sound in the second frequency band captured on the first audio track, the second frequency energy representation including energy portions conveying energy magnitude for individual sampling periods of the first sampling period length;
   filtering the first audio energy representation of the first audio track having the first track duration, into multiple frequency bands, the frequency bands including the first frequency band and the second frequency band to produce a third frequency energy representation and a fourth frequency energy representation, the fourth frequency energy representation representing individual energy samples associated with sound in the first frequency band captured on the first audio track, the third frequency energy representation including energy portions conveying energy magnitude for individual sampling periods of a second sampling period length, the fourth frequency energy representation representing individual energy samples associated with sound in the second frequency band captured on the first audio track, the fourth frequency energy representation including energy portions conveying energy magnitude for individual sampling periods of the second sampling period length;
   filtering a second audio energy representation of a second audio track having a second track duration, into multiple frequency bands, the frequency bands including the first frequency band and the second frequency band to produce a fifth frequency energy representation and a sixth frequency energy representation, the fifth frequency energy representation representing individual energy samples associated sound in the first frequency band captured on the second audio track, the fifth frequency energy representation including energy portions conveying energy magnitude for individual sampling periods of the first sampling period length, the sixth frequency energy representation representing individual energy samples associated sound in the second frequency band captured on the second audio track, the sixth frequency energy representation including energy portions conveying energy magnitude for individual sampling periods of the first sampling period length;
   filtering the second audio energy representation of the second audio track having the second track duration, into multiple of frequency bands, the frequency bands including the first frequency band and the second frequency band to produce a seventh frequency energy representation and an eighth frequency energy representation, the seventh frequency energy representation representing individual energy samples associated with sound in the first frequency band captured on the second audio track, the seventh frequency energy representation including energy portions conveying energy magnitude for individual sampling periods of the second sampling period length, the eighth frequency energy representation representing individual energy samples associated with sound in the second frequency band captured on the second audio track, the eighth frequency energy representation including energy portions conveying energy magnitude for individual sampling periods of the second sampling period length;
   comparing a first energy portion of the first frequency energy representation, the first energy portion corresponding to a portion of the first track duration at the first sampling period length, to a second energy portion of the fifth frequency energy representation, the second energy portion corresponding to a portion of the second track duration at the first sampling period length, and correlating one or more energy samples in the first frequency energy representation with one or more energy samples in the fifth frequency energy representation based on the comparison, the correlated energy samples being identified as potentially representing energy in the same sounds;
   comparing the first energy portion of the second frequency energy representation to the second portion of the sixth frequency energy representation to correlate one or more energy samples in the second frequency energy representation with one or more energy samples in the sixth frequency energy representation the correlated energy samples being identified as potentially representing energy in the same sounds;
   comparing a third energy portion of the third frequency energy representation, the third energy portion corresponding to a portion of the first track duration at the second sampling period length, to a fourth energy portion of the seventh frequency energy representation, the fourth energy portion corresponding to a portion of the second track duration at the second sampling period length, to correlate one or more energy samples in the third frequency energy representation with one or more energy samples in the seventh frequency energy representation, the third energy portion and the fourth energy portion being selected for the comparison based on the correlation of energy samples between the first frequency energy representation and the fifth frequency energy representation;

comparing the third energy portion of the fourth frequency energy representation to the fourth energy portion of the eighth frequency energy representation to correlate one or more energy samples in the fourth frequency energy representation with one or more energy samples in the eighth frequency energy representation;

determining, from the correlations of individual energy samples in individual frequency energy representations, a temporal alignment estimate between the first audio track and the second audio track, the temporal alignment estimate reflecting an offset in time between commencement of sound in the first audio track and commencement of sound in the second audio track; and synchronizing the first audio track with the second audio track based on the temporal alignment estimate.

2. The method of claim 1, further comprising:

producing a first vector for the first audio track, the first vector comprising an array of individual energy samples for the first energy portion of the first frequency energy representation and the second frequency energy representation;

producing a second energy vector for the first audio track, the second vector comprising an array of individual energy samples for the first energy portion of the fourth frequency energy representation and the fifth frequency energy representation;

producing a third vector for the second audio track, third vector comprising an array of individual energy samples for the third energy portion of the fifth frequency energy representation and the sixth frequency energy representation;

producing a fourth vector for the second audio track, the fourth vector comprising an array of individual energy samples for the fourth energy portion of the seventh frequency energy representation and the eighth frequency energy representation;

comparing the first vector to the third vector to correlate one or more energy samples in the first frequency energy representation with one or more energy samples in the fifth frequency energy representation and to correlate one or more energy samples in the second frequency energy representation with one or more energy samples in the sixth frequency energy representation, the correlated energy samples being identified as potentially representing energy in the same sounds;

comparing the second vector to the fourth vector to correlate one or more energy samples in the third frequency energy representation with one or more energy samples in the seventh frequency energy representation and to correlate one or more energy samples in the fourth frequency energy representation with one or more energy samples in the eighth frequency energy representation;

determining, from the correlations of individual energy samples in the vectors, a temporal alignment estimate between the first audio track and the second audio track, the temporal alignment estimate reflecting an offset in time between commencement of sound in the first audio track and commencement of sound in the second audio track;

and synchronizing the first audio track with the second audio track based on the temporal alignment estimate.

3. The method of claim 1, wherein the temporal alignment estimate reflects corresponding energy samples between the first frequency energy representation and the fifth frequency energy representation.

4. The method of claim 1, further comprising:

selecting a comparison window to at least one portion of the first frequency energy representation and to at least one portion the fifth frequency energy representation, the comparison window having a start position and an end position, such that the start position corresponding with the individual energy sample having been selected at random, the end position corresponding with the individual energy sample having a predetermined value.

5. The method of claim 4, wherein the comparison window is selected to at least one portion of the third frequency energy representation and to at least one portion of the seventh frequency energy representation based on the start position and the end position of the first frequency energy representation and the third frequency energy representation.

6. The method of claim 1, further comprising:

obtaining a temporal alignment threshold;

comparing the temporal alignment estimate with the temporal alignment threshold; and determining whether to continue comparing frequency energy representations associated with the first audio track and the second audio track based on the comparison of the temporal alignment estimate and the temporal alignment threshold.

7. The method of claim 6, wherein determining whether to continue comparing frequency energy representations associated with the first audio track and the second audio track includes determining to not continue comparing frequency energy representations associated with the first audio track and the second audio track in response to the temporal alignment estimate being smaller than the temporal alignment threshold.

8. The method of claim 1, further comprising:

determining whether to continue comparing frequency energy representations associated with the first audio track and the second audio track by assessing whether a stopping criteria has been satisfied, such determination being based on the temporal alignment estimate and the stopping criteria.

9. The method of claim 8, wherein the stopping criteria is satisfied by multiple, consecutive determinations of the temporal alignment estimate falling within a specific range or ranges.

10. The method of claim 9, wherein the specific range or ranges are bounded by a temporal alignment threshold or thresholds.

11. The method of claim 1, further comprising:

a) filtering the first audio energy representation of the first audio track into an other frequency band to produce an other frequency energy representation, the other frequency energy representation representing individual energy samples associated with sound in the other frequency band captured on the first audio track, the other frequency energy representation conveying feature magnitude for individual sampling periods of an other sampling period length;

b) filtering the first audio energy representation of the second audio track into an other frequency band to produce an other frequency energy representation, the other frequency energy representation representing individual energy samples associated with sound in the other frequency band captured on the second audio track, the other frequency energy representation conveying feature magnitude for individual sampling periods of an other sampling period length;

c) comparing an other energy portion of the other frequency energy representation for the first audio track against an other energy portion of the other frequency energy representation for the second audio track to correlate one or more energy samples in the other frequency energy representation for the first audio track with one or more energy samples in the other frequency energy representation for the second audio track;

(d) determining an other temporal alignment estimate between the first audio track and the second audio track;

(e) obtaining an other temporal alignment threshold;

(f) determining whether to continue comparing frequency energy representations associated with the first audio track and the second audio track based on the comparison of the other temporal alignment estimate and the other temporal alignment threshold, including determining to not continue comparing frequency energy representations associated with the first audio track and the second track in response to the other temporal alignment estimate being smaller than the other alignment threshold;

(g) responsive to the determining to not continue comparing frequency energy representations associated with the first audio track and the second audio track, using the other temporal alignment estimate to synchronize the first audio track with the second audio track;

(h) responsive to the determining to continue comparing frequency energy representations associated with the first audio track and the second audio track, iterating after operations (a) through (g).

12. The method of claim 1, wherein the frequency bands are set linearly.

13. The method of claim 1, wherein the frequency bands are set logarithmically.

14. The method of claim 1, wherein the first audio track is generated from a first media file, the first media file including audio and video information.

15. The method of claim 1, wherein the second audio track is generated from a second media file, the second media file including audio and video information.

16. The method of claim 1, further comprising:

(a) producing an other vector for the first audio track, the other vector comprising an array of individual energy samples for an other energy portion of the first frequency energy representation and the second frequency energy representation;

(b) producing an other energy vector for the first audio track, the other vector comprising an array of individual energy samples for the other energy portion of the fourth frequency energy representation and the fifth frequency energy presentation;

(c) producing an other vector for the second audio track, third vector comprising an array of individual energy samples for the third energy portion of the fifth frequency energy representation and the sixth frequency energy representation;

(d) producing an other vector for the second audio track, the other vector comprising an array of individual energy samples for the other energy portion of the seventh frequency energy representation and the eighth frequency energy representation;

(e) comparing the other vector to the third vector to correlate one or more energy samples in the first frequency energy representation with one or more energy samples in the fifth frequency energy representation and to correlate one or more energy samples in the second frequency energy representation with one or more energy samples in the sixth frequency energy representation, the correlated energy samples being identified as potentially representing energy in the same sounds;

(f) comparing the other vector to the fourth vector to correlate one or more energy samples in the third frequency energy representation with one or more energy samples in the seventh frequency energy representation and to correlate one or more energy samples in the fourth frequency energy representation with one or more energy samples in the eighth frequency energy representation;

(g) determining, from the correlations of individual energy samples in the vectors, a temporal alignment estimate between the first audio track and the second audio track, the temporal alignment estimate reflecting an offset in time between commencement of sound in the first audio track and commencement of sound in the second audio track;

(h) synchronizing the first audio track with the second audio track based on the temporal alignment estimate;

(i) responsive to the determining to continue comparing vectors associated with the first audio track and the second audio track, iterating after operations (a) through (h).

* * * * *